(12) United States Patent
Baird

(10) Patent No.: US 8,120,637 B2
(45) Date of Patent: Feb. 21, 2012

(54) VIRTUAL THEATER SYSTEM FOR THE HOME

(75) Inventor: Randall B. Baird, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1554 days.

(21) Appl. No.: 11/523,847

(22) Filed: Sep. 20, 2006

(65) Prior Publication Data

US 2008/0071399 A1    Mar. 20, 2008

(51) Int. Cl.
 *H04N 7/14* (2006.01)
(52) U.S. Cl. ............... 348/14.08; 348/14.12; 348/14.09
(58) Field of Classification Search .... 348/14.01–14.16; 725/143, 153, 135, 74, 78, 105, 93; 434/323, 434/350, 362
See application file for complete search history.

(56) References Cited

U.S. PATENT DOCUMENTS

| | | | |
|---|---|---|---|
| 5,483,587 A | 1/1996 | Hogan et al. | |
| 5,600,366 A | 2/1997 | Schulman | |
| 5,673,253 A | 9/1997 | Shaffer | |
| 5,729,687 A | 3/1998 | Rothrock et al. | |
| 5,917,830 A | 6/1999 | Chen et al. | |
| 5,963,217 A | 10/1999 | Grayson et al. | |
| 6,044,081 A | 3/2000 | Bell et al. | |
| 6,141,324 A | 10/2000 | Abbott et al. | |
| 6,155,840 A * | 12/2000 | Sallette | 434/323 |
| 6,236,854 B1 | 5/2001 | Bradshaw | |
| 6,269,107 B1 | 7/2001 | Jong | |
| 6,332,153 B1 | 12/2001 | Cohen | |
| 6,501,739 B1 | 12/2002 | Cohen | |
| 6,505,169 B1 | 1/2003 | Bhgavath et al. | |
| 6,590,602 B1 * | 7/2003 | Fernandez et al. | 348/14.08 |
| 6,608,820 B1 | 8/2003 | Bradshaw | |
| 6,671,262 B1 | 12/2003 | Kung et al. | |
| 6,675,216 B1 | 1/2004 | Quatrano et al. | |
| 6,718,553 B2 | 4/2004 | Kenworthy | |
| 6,735,572 B2 | 5/2004 | Landesmann | |
| 6,771,644 B1 | 8/2004 | Brassil et al. | |
| 6,771,657 B1 | 8/2004 | Elstermann | |
| 6,775,247 B1 | 8/2004 | Shaffer et al. | |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,925,068 B1 | 8/2005 | Stanwood et al. | |
| 6,931,001 B2 | 8/2005 | Deng | |
| 6,931,113 B2 | 8/2005 | Ortel | |
| 6,937,569 B1 | 8/2005 | Sarkar et al. | |

(Continued)

FOREIGN PATENT DOCUMENTS

EP    1 553 735 A1    7/2005

*Primary Examiner* — Melur Ramakrishnaiah
(74) *Attorney, Agent, or Firm* — Baker Botts L.L.P.

(57) ABSTRACT

In one embodiment, a system includes a mixer that creates customized mixed audio streams by synchronously mix audience reaction data packets received from a plurality of virtual theater nodes with a soundtrack of a movie. The audience reaction data packets are produced by viewers watching the movie. The mixer transmits each customized mixed audio streams to a corresponding one of the virtual theater nodes. A video streamer streams video data packets to each of the virtual theater nodes, the video data packets being synchronized with each of the customized mixed audio streams. It is emphasized that this abstract is provided to comply with the rules requiring an abstract that will allow a searcher or other reader to quickly ascertain the subject matter of the technical disclosure.

25 Claims, 4 Drawing Sheets

U.S. PATENT DOCUMENTS

| | | |
|---|---|---|
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,084,898 B1 | 8/2006 | Firestone et al. |
| 2001/0000540 A1 | 4/2001 | Cooper et al. |
| 2002/0095679 A1* | 7/2002 | Bonini ............................ 725/74 |
| 2003/0076850 A1 | 4/2003 | Jason, Jr. |
| 2003/0198195 A1 | 10/2003 | Li |
| 2004/0015993 A1* | 1/2004 | Yacenda et al. ................. 725/87 |
| 2004/0031063 A1* | 2/2004 | Satoda .......................... 725/143 |
| 2004/0165710 A1 | 8/2004 | DelHoyo et al. |
| 2004/0213152 A1 | 10/2004 | Matuoka et al. |
| 2004/0252851 A1* | 12/2004 | Braun ........................... 381/101 |
| 2005/0069102 A1 | 3/2005 | Chang |
| 2007/0153712 A1* | 7/2007 | Fry et al. ....................... 370/263 |

\* cited by examiner

VIRTUAL THEATER SYSTEM FOR THE HOME

TECHNICAL FIELD

The present disclosure relates generally to data networks and communication systems.

BACKGROUND

Home theater technology is improving very rapidly, eroding movie theater ticket sales as the experience at home begins to rival that of the big screen. Home theater setups often include a high-definition (HD) television screen and a surround sound system with three front speakers, two rear speakers, and one sub-woofer speaker that provide excellent audio-location of sound in a room. As home theater technology continues to improve, more people will choose to view movies in the relative comfort of their home living room rather than in a commercial movie theater.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
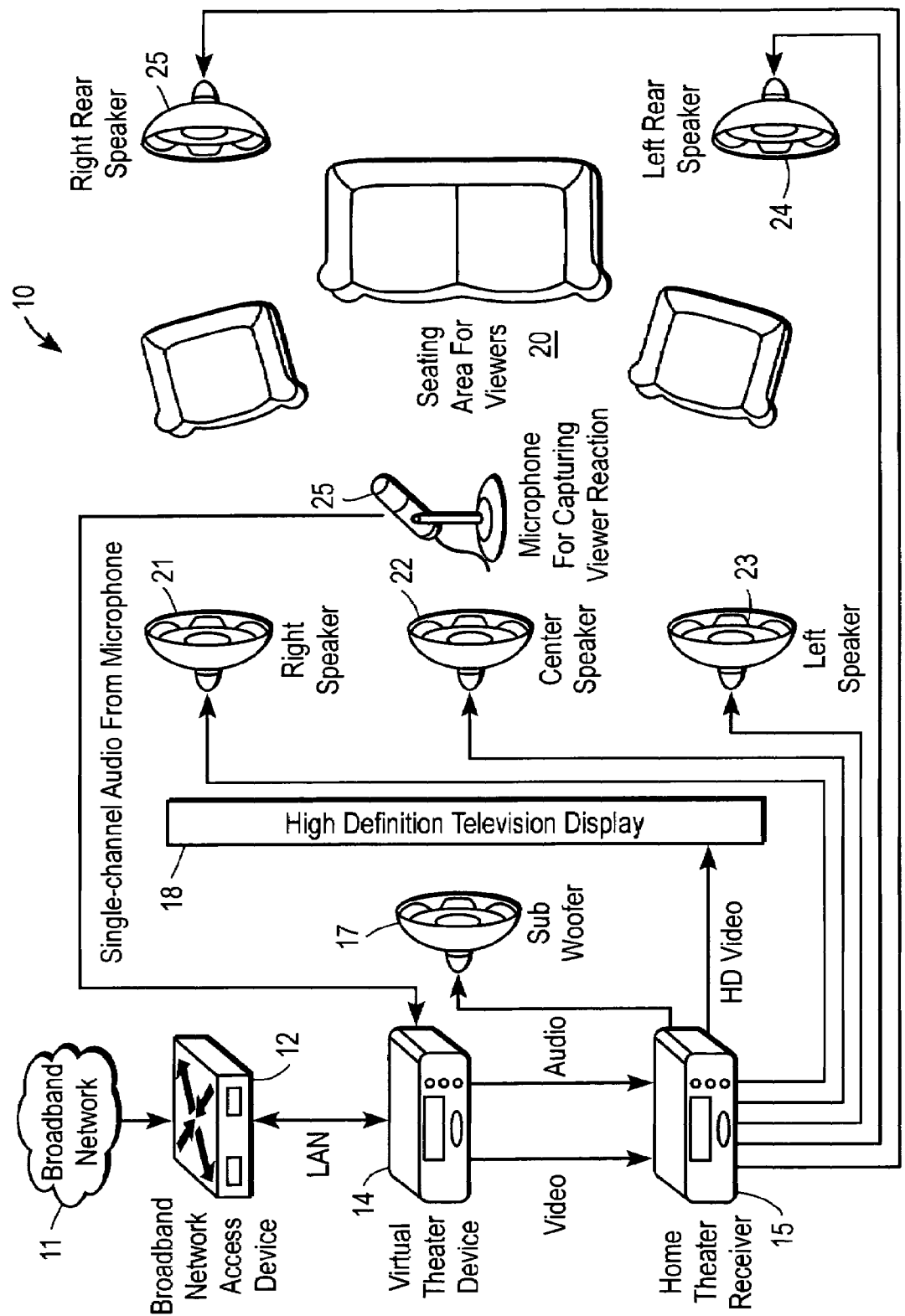
FIG. 1 illustrates an example virtual theater node.

In the following description specific details are set forth, such as device types, system configurations, protocols, applications, methods, etc., in order to provide a thorough understanding of the present invention. However, persons having ordinary skill in the relevant arts will appreciate that these specific details may not be needed to practice the present invention.

According to one embodiment of the present invention, conferencing technology is utilized to create a virtual audience sound experience for home theater viewers. (In the context of the present application the phrases "movie viewing", "viewing a movie", etc., includes the experience of watching the visual aspects of a movie and listening to an audio mix which includes the movie soundtrack and sounds of a virtual audience.) For example, a group of friends may want to view a particular film on a virtual theater basis with each person watching the film on their respective home theater systems. In such a case, the friends would like to talk among themselves freely while the film is playing, with certain sounds (e.g., cellphone ring tones, coughing, background noises, etc.) being selectively filtered out. To create such a virtual theater, each person's home theater system is treated as a virtual theater node by a conferencing system that synchronously mixes together the soundtrack with the voices and other sounds received from a microphone located in each virtual theatergoer's home.

In one embodiment, the start times of a community of home theater viewers are synchronized so that the virtual audience reaction is synchronized with the soundtrack of the movie. This first involves each person registering their home theater system as a virtual theater node with a conferencing system that then creates a virtual seating location for each person in a virtual theater. In a particular implementation, a user (i.e., home theater viewer) may request what type of audience experience he would like to experience. The request may be based on demographics, social themes, number of viewers per virtual theater, or other factors affecting the viewing experience. In some cases, a person may request to create a virtual theater with a group of friends so they may jointly experience the film together in a virtual theater setting. In other cases, the person may simply request to experience a movie on an ad hoc basis with strangers or based on a certain selected set of factors such as those listed above.

It should be understood that the conferencing system that provides the virtual audience reaction may be located anywhere on a packet-based communication network that connects each of the virtual theatergoers together to create a shared experience. In some embodiments the conferencing system may comprise a server that performs the various processing and mixing functions described herein. In other embodiments, the conferencing system (including the sound processing/mixing functions) may be distributed among multiple servers, or, alternatively, implemented in a distributed fashion in the virtual theater devices located in each theatergoer's home theater system.

FIG. 1 illustrates an example virtual theater node 10 that includes a broadband network access device 12 connected with a broadband network 11, which carries the audio/video transmissions, e.g., Real-Time Transport Protocol (RTP) packets, that include the movie audio/video content and the virtual audience audio reactions (e.g., laughter, crying, cheering, talking, fidgeting in chairs, etc.). Broadband network access device 12 comprises a standard modem, router, access point, etc., useful in connecting with a high-speed data communications network. Broadband network access device 12 is shown connected with a virtual theater device 14 via a local area network (LAN).

Virtual theater device 14 performs the audio mixing of the soundtrack with the audience reactions to create a virtual theater experience for the person(s) viewing the movie in a seating area 20. Device 14 is shown having audio and video outputs coupled to home theater receiver 15. Outputs to receiver 15 may be in any form acceptable to the receiver, including, but not limited to, analog audio, composite video, component video, or the High-Definition Multimedia Interface (HDMI). Receiver 15 produces a high-definition output for television display 18, and also generates the amplified audio signals for speakers 17 and 21-25 in order to create a theater surround sound experience for the persons in seating area 20. In one embodiment, receiver 15 may comprise a standard set-top box or receiver modified in accordance with the functionality described herein.

A microphone 25 is positioned to receive sound from seating area 20 and provides a single-channel audio input of the viewer's reaction to virtual theater device 14. In another embodiment, multiple microphones may receive multi-channel sound from the seating area 20. Device 14 separates the viewer's reaction sounds from the movie's soundtrack audio produced by speakers 21-25 for transmission to the other virtual theater nodes included in the virtual theater experience. Device 14 may also perform various filtering functions on the incoming audio streams received from device 12, e.g., to filter out background noises or other undesirable sounds from other virtual theater nodes, before summing and mixing the audience reaction sounds with the movie soundtrack. In a specific implementation, device 14 may also add ambiance, so that the sounds appear to be echoing from a large cavernous theater, and/or spatially manipulating the output with respect to the theatergoer's location in the virtual theater.

In yet another embodiment, a virtual theater provider is also the content provider for the movie such that the virtual audience track is mixed directly into the audio soundtrack delivered to the virtual theater node.

It is appreciated that virtual theater device 14 may apply any one of a wide variety of audio mixing algorithms to produce the output audio stream delivered to home theater receiver 15. In one embodiment, the audio mixer in device 14 may select a small number (e.g., 3) of the loudest input channels, outputting special mixes for return back to the theater nodes that respectively produced those audio input streams. A single generic mix may be returned to the remaining nodes in the virtual theater.

In another embodiment all input channels may be mixed to produce the broadest possible audience reaction. In this embodiment, a special mix is produced for each virtual theater node so that echo and feedback of an individual virtual theater node's reaction doesn't appear in that node's audio output. Note that in certain embodiments, the audio mixer may filter out annoyances by dynamically suppressing audio streams that meet predefined annoyance criteria (e.g., white noise, pink noise, snoring, etc.). It is appreciated that for non-verbal audience reaction, the audio mix can be of relatively low-fidelity. However, for applications where verbal reaction is not to be filtered out as an annoyance, the verbal audience reaction should be of relatively high-fidelity.

Practitioners in the art will further appreciate that devices 12, 14 and receiver 15—or any combination thereof—may be integrated into a single box or unit. That is, the functions performed by each of devices 12, 14 and receiver 15 need not be separated into separate physical boxes or entities. Furthermore, some or all of the functions of device 14 may be implemented by a service provider as part of a service package offered to a customer.

Virtual theater device 14 may include a user interface, e.g., various input selection buttons, for enabling/disabling different optional features. For instance, each node may provide a user with the ability to optionally filter out certain noises on a node-by-node basis. In one embodiment, the audio mixer in device 14 simply halts mixing audio from an offending virtual theater node as soon as the offending noise is detected. A variety of known audio waveform detection and analysis algorithms may be employed for this purpose. Other features may include a pause/resume button that allows a virtual theatergoer to step out of the theater for a while, essentially muting microphone 25. A "group pause" or intermission feature may also be included in the list of options available via the user interface. More sophisticated user interfaces may accommodate such features as a chat room for commenting on the movie, and a tablet input device that allows users to overlay drawings or handwriting on the video output.

Additionally, a camera may be included in the system of FIG. 1 for capturing an image of the viewers seated in area 20. The attendee video may be added to a sidebar area of the movie viewing screen to allow virtual theatergoers to see an image of a person who is talking during the movie. This latter feature may be especially useful for virtual groups of friends who watch a movie together.

Figure 2:
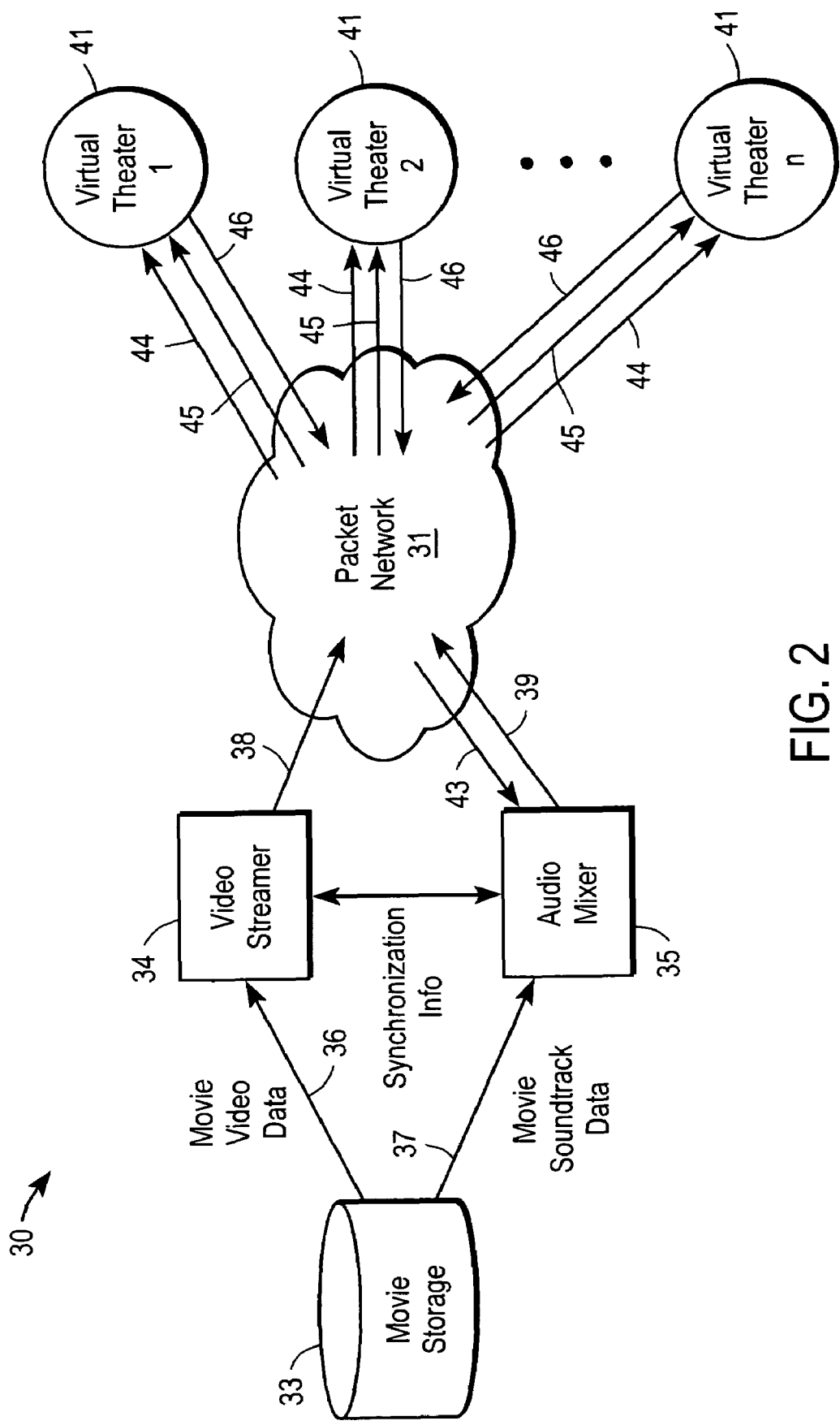
FIG. 2 illustrates example communication in a virtual theater system.

FIG. 2 illustrates example communication in a virtual theater system between a repository or movie storage unit 33 that outputs separate respective movie video and audio (soundtrack) streams 36 & 37 for transmission to a set of n virtual theater nodes 41. For example, in one implementation, unit 33 may comprise a magnetic or optical disk drive unit. In another implementation, unit 33 may comprise a number of hard disk drives (HDDs) having a relatively large total storage capacity (e.g., ten terabytes) arranged as a RAID ("Redundant Array of Inexpensive Disks") that functions as a media library apparatus. In one embodiment, video streamer 34 and audio mixer 35 comprise functional components for handling and processing the respective video and audio data provided by unit 33. In the embodiment shown, streamer 34 and mixer 35 are both associated with a service provider that streams movies to subscribers or customers on a scheduled or on-demand basis. In other words, the service provider delivers the movie (video plus sound) with the audience reaction already mixed into the movie soundtrack. In the example of FIG. 2, the video packet stream output across network 31 is indicated by arrow 38. On the other side of network 31, arrows 44 represent the video streams delivered to each of virtual theatre nodes 41.

Audio mixer 35 operates to mix the movie soundtrack received from movie storage unit 33 with the audience reaction streams received on connections 43 over packet network 31 from each of virtual nodes 41. For each virtual node 41, mixer 35 outputs an audio stream that represents a mixed movie soundtrack plus an audience reaction packet stream—the audience reaction packet stream being customized for each virtual theater node 41. On the right-hand side of network 31, the individual audience reaction streams produced by nodes 41 are represented by arrows 46. Arrow 43 illustrates the collection of audience reaction streams being received by audio mixer 35. The mixed audio streams output by mixer 35 for transmission to the virtual theater nodes 41 are represented by arrow 39. Arrows 45 represent the customized audio streams being delivered to from network 31 to each of the virtual theater nodes. In addition to receiving a customized audio stream, each virtual theater node 41 receives a movie video packet stream that is synchronized to the corresponding mixed audio packet stream.

In an alternative system configuration, one of the virtual theater nodes can deliver the movie and soundtrack to the service provider, with the service provider then providing the mixed audio output back to each virtual theater node that includes the audience reaction.

In still another alternative embodiment, the movie is downloaded to each of the virtual theater nodes in advance of the scheduled start time of the movie. During playback of the movie, the audience reaction is mixed into the soundtrack either by the service provider, or, alternatively, by a mixer located in each of the virtual theater devices or set-top boxes of the corresponding theater nodes. In this embodiment, playback in the various virtual theater nodes is synchronized by the virtual theater devices or set-top boxes.

In yet another embodiment, high quality (e.g., HD) video may be produced by synchronized digital video disk (DVD) players—one in each of the local virtual theater nodes—with the audio, which includes a mix of the soundtrack and audience reaction, being provided by the service provider.

Figure 3B:
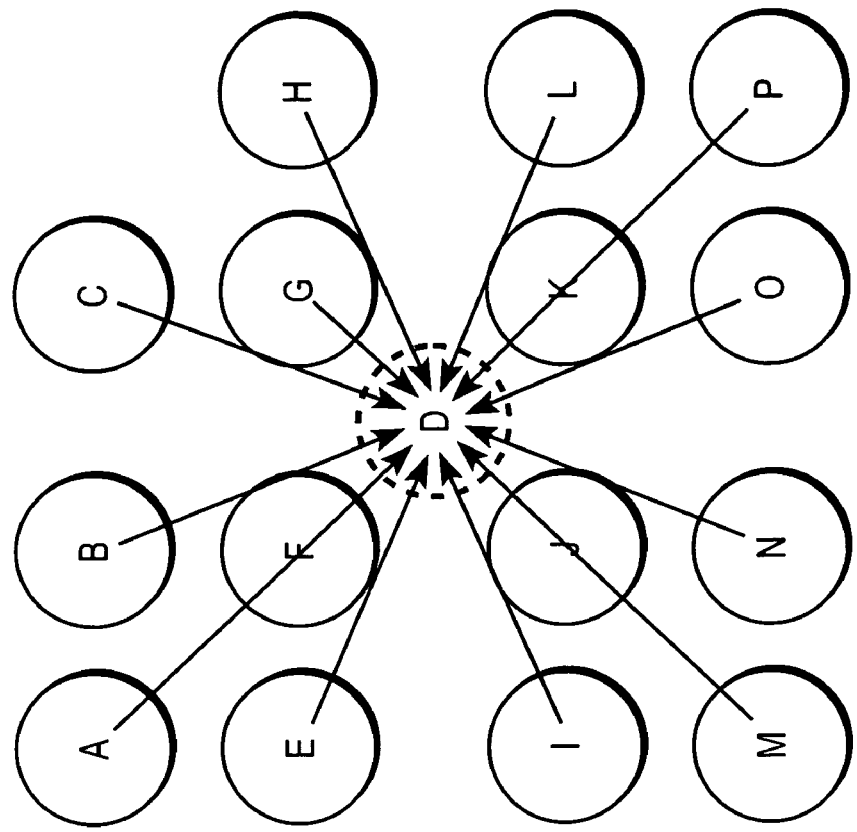
FIG. 3B illustrates example sound perception at one of the virtual theater nodes illustrated in FIG. 3A.
Figure 3A:
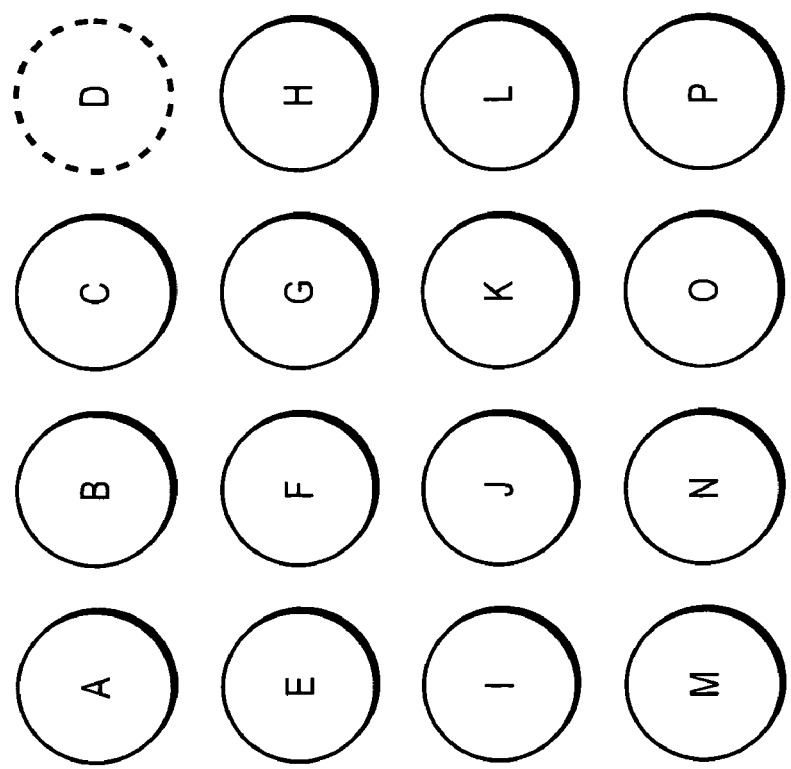
FIG. 3A illustrates example geometry of a virtual seating chart for a set of virtual theater nodes.

FIG. 3A illustrates example geometry of a virtual seating chart for a set of virtual theater nodes. In this example, the virtual theater is shown being populated by sixteen different virtual theater nodes (labeled A-P). Audience reaction for each node is imaged according to this geometry. That is, the customized audio output packet stream produced for each virtual theater node is generated in accordance with a virtual seating chart. The virtual seating chart may be generated by the service provider, by a virtual theater device of an individual node, or by any other device associated with the virtual theater system or communication network. Alternatively, each node may create its own custom virtual seating chart, with the virtual theater device of each node acting to mix the audience reaction (e.g., on a node-by-node basis) in accordance with the seating chart thus created.

FIG. 3B illustrates example sound perception at one of the virtual theater nodes illustrated in FIG. 3A, i.e., how a particular virtual theater node (i.e., node "D") may receive the imaging of the reaction from the other nodes in the theater. As can be seen, the mixed audio output delivered to a particular node is such that the node basically perceives itself as being in the center of the virtual theater. In this case, the amplitude of the audience reaction sounds produced by the nearest nodes (i.e., nodes "F", "G", "J" and "K") may be delivered in the mix to node "D" with an amplitude that is relatively greater (e.g., louder) than the audience reaction sounds produced by the farthest nodes in the virtual seating chart (i.e., nodes "A", "M" and "P").

A virtual theater may be populated in a variety of different manners. For instance, a near-video on-demand (NVOD) service may be provided in which the service provider periodically (e.g., every 5-15 minutes) create a new virtual theater for a particular movie, with all the viewers who requested to view that movie during the lead-time interval prior to the start being included in the new virtual theater population. Another approach to populating a virtual theater is by invitation, wherein a list of invited theatergoers or participants to the movie is provided to the service provider. The service provider then starts the movie when a quorum of the invitees is present. Still another possibility involves the service provider associating theatergoers based on certain specified criteria or characteristics. By way of example, viewers may specify of the audience that they'd like to watch a particular movie with based on age or other demographic information; geographic location; rowdiness of the viewers, the size of the group populating the virtual theater, etc. The movie may begin after the service provider has a quorum of nodes that satisfy the criteria for a specific virtual theater.

Figure 4:
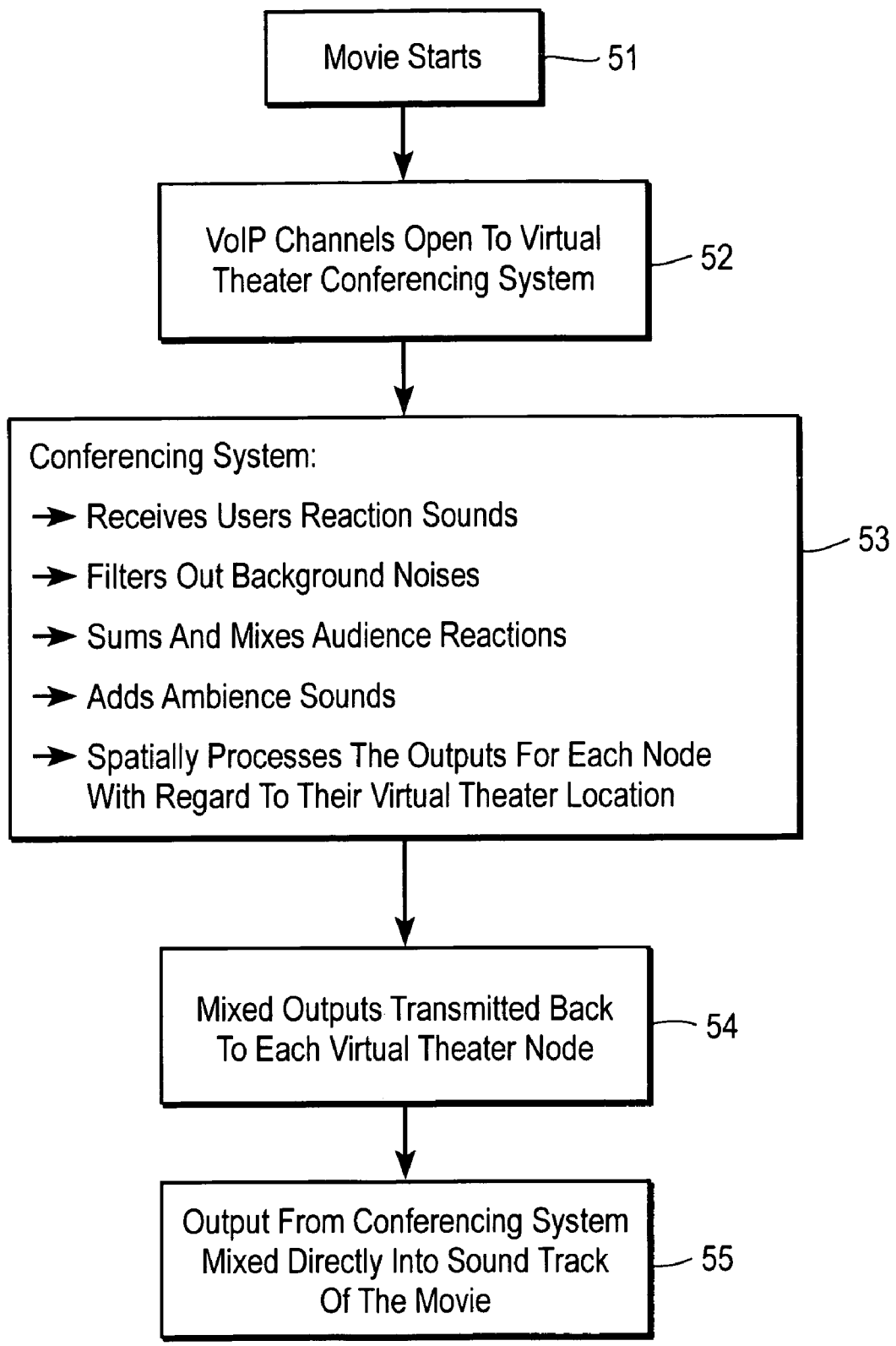
FIG. 4 illustrates an example method for a virtual theater system.

FIG. 4 illustrates an example method for a virtual theater system. When the movie starts (block 51) a voice over IP (VoIP) audio channel is opened up to a virtual theater conferencing system (block 52). The virtual theater conferencing system functions may be embodied in a server located anywhere on the IP network, or distributed among the virtual theater nodes, as described previously. During the movie, the conferencing system receives audio reactions from each of the participating virtual theater nodes, sums and mixes the audience reactions, and spatially processes the mixed audio output stream delivered to each virtual theater node with regard to the node's location in the virtual theater. The virtual theater conferencing system may also filter out talking or other background noises, as well as add ambience sounds to the audio mix output to each of the virtual theater nodes. Each of these operations is represented by block 53 in FIG. 4.

The mixed output streams are then transmitted back to the respective virtual theater nodes (block 54). The received audience reaction packet stream received from the virtual theater conferencing system is then mixed directly into the audio delivery channel of the movie (block 55).

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A system comprising:
   one or more processors; and
   a memory comprising one or more instructions executable at the processors, the processors operable when executing the instructions to:
   mix audio data packets received from a plurality of virtual theater nodes into the soundtrack of a movie for playback at the virtual theater nodes, the virtual theater nodes each comprising a home theater system, with each of the virtual theater nodes being coupled to each other to provide a virtual theater environment with a virtual audience sound experience based on a virtual theater seating chart; and
   synchronize the playback of the mixed soundtrack with playback of video data packets of the movie at the virtual theater nodes, wherein the virtual audience sound experience is customized for each of the virtual nodes in correspondence with the virtual seating chart.

2. The system of claim 1 wherein the audio data packets comprise an audience reaction to the movie.

3. The system of claim 1 wherein the audio data packets are mixed by a device of the home theater system of each virtual theater node.

4. The system of claim 1 wherein the audio data packets are mixed by a service provider.

5. The system of claim 1 wherein the processors are further operable, when executing the instructions, to download the movie to a storage unit of the home theater system of each virtual theatre node.

6. A method comprising:
   mixing audio data packets received from one or more remote virtual theater nodes into the soundtrack of a movie for playback at a home virtual theater node, each of the one or more remote virtual theater nodes and the home virtual theater node comprising a home theater system, the one or more remote virtual theater nodes and the home virtual theater node being coupled to each other to provide a virtual theater environment with a virtual audience sound experience based on a virtual theater seating chart; and
   synchronizing the playback of the mixed soundtrack with playback of video data packets of the movie at the home virtual theater node, wherein the virtual audience sound experience is customized for each of the virtual nodes in correspondence with the virtual seating chart.

7. The method of claim 6 wherein the audio data packets comprise an audience reaction to the movie.

8. The method of claim 6 wherein the virtual theater seating chart is such that the home virtual theater node is perceived as being located in a center of the virtual theater environment.

9. The method of claim 6 further comprising downloading the movie into a storage unit of the home theater system of the home virtual theatre node.

10. The method of claim 6 further comprising receiving the video data packets at the home virtual theater node, the video data packets being streamed to the home virtual theater node via a network.

11. The method of claim 6 further comprising adding a theater ambiance sound into the playback of the mixed soundtrack.

12. A method, comprising:
capturing sounds from viewers of a movie played in a virtual theater consisting of a plurality of virtual theater nodes connected to a network, the virtual theater nodes each comprising a home theater system, the movie comprising a soundtrack and video data packets, the viewers being located in the virtual theater nodes; and
synchronously mixing the sounds with the soundtrack to create a plurality of playbacks, each playback being customized for a corresponding virtual theater node to create a virtual audience sound experience based on a virtual theater seating chart, each playback being synchronized with the video data packets of the movie.

13. The method of claim 12 wherein the sounds include audience reaction sounds.

14. The method of claim 12 further comprising filtering out undesirable sounds received from the set of virtual theater nodes prior to mixing the sounds with the soundtrack.

15. The method of claim 12 further comprising adding a theater ambiance sound into each playback.

16. The method of claim 12 further comprising delivering each playback to the corresponding virtual theater node.

17. The method of claim 12 further comprising downloading the movie to each of the virtual theater nodes in advance of a scheduled start time of the movie.

18. The method of claim 12 wherein the synchronous mixing of the sounds is performed by a service provider.

19. The method of claim 12 wherein the synchronous mixing of the sounds is performed on a per-node basis by a mixer associated with in each of the virtual theater nodes.

20. A system comprising:
a mixer operable to:
generate customized mixed audio streams by synchronously mixing audience reaction data packets received from a plurality of virtual theater nodes with a soundtrack of a movie, each of the virtual theatre nodes comprising a home theater system, the audience reaction data packets comprising data that represent reactions to the movie by viewers watching the movie at the virtual theater nodes, the mixed audio streams being customized for each of the virtual theater nodes in correspondence with a virtual seating chart of a virtual theater; and
communicate each of the customized mixed audio streams to a corresponding one of the virtual theater nodes; and
a video streamer operable to stream video data packets to each of the virtual theater nodes, the video data packets being synchronized with each of the customized mixed audio streams, the video data packets comprising a video element of the movie.

21. The system of claim 20 wherein the virtual seating chart comprises a geometrical arrangement of the virtual theater nodes.

22. The system of claim 20 wherein the virtual theater seating chart is such that each virtual theater node is perceived as being located in a center position of the virtual theater.

23. The system of claim 20 further comprising a user interface that provides a user with the ability to pause the movie.

24. The system of claim 20 further comprising a filter operable to filter out undesirable sounds received from the set of virtual theater nodes prior to mixing the audience reaction data packets with the soundtrack.

25. The system of claim 20 wherein the mixer is further operable to mix a theater ambiance sound with the soundtrack.

* * * * *